United States Patent [19]
Rozema

[11] Patent Number: 5,795,600
[45] Date of Patent: Aug. 18, 1998

[54] MELT DUCTING ARRANGEMENT FOR INJECTION MOLDING NOZZLE

[75] Inventor: Henry J. Rozema, Brampton, Canada

[73] Assignee: Tradesco Mold Limited, Rexdale, Canada

[21] Appl. No.: 839,569

[22] Filed: Apr. 15, 1997

[51] Int. Cl.$^6$ .................................................. B29C 45/23
[52] U.S. Cl. ........................ 425/562; 264/328.9; 425/564
[58] Field of Search ............................ 425/562, 563, 425/564, 565, 566, 572; 264/328.9

[56] References Cited

U.S. PATENT DOCUMENTS

| | | | |
|---|---|---|---|
| 4,705,473 | 11/1987 | Schmidt | 425/562 |
| 4,729,733 | 3/1988 | Schmidt | 425/566 |
| 4,917,593 | 4/1990 | Gellert | 425/564 |

*Primary Examiner*—Tim Heitbrink
*Attorney, Agent, or Firm*—Rogers & Milne

[57] ABSTRACT

A melt ducting arrangement for an injection molding system having a heated nozzle, a valve pin axially slideable in the heated nozzle and a guide bushing for the valve pin which extends into a manifold and of the heated nozzle. The melt ducting arrangement includes a groove in the heated nozzle extending at least part way around the guide bushing. A melt passage extends between the groove and a melt passage in a manifold. The guide bushing has a hole extending generally axially therethrough. The hole has a narrower diameter portion facing away from the heated nozzle and a wider diameter portion facing into the heated nozzle. The narrower diameter portion slideably receives and guides a valve pin. The wider diameter portion provides space to receive melt between the valve pin and the bushing. Radially spaced openings extend through the bushing and register with the groove and to provide a melt conduit between the bushing and the wider diameter portion of the hole.

4 Claims, 1 Drawing Sheet

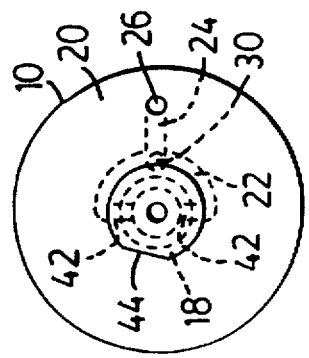
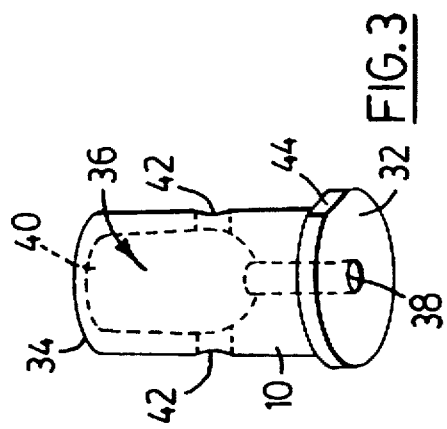
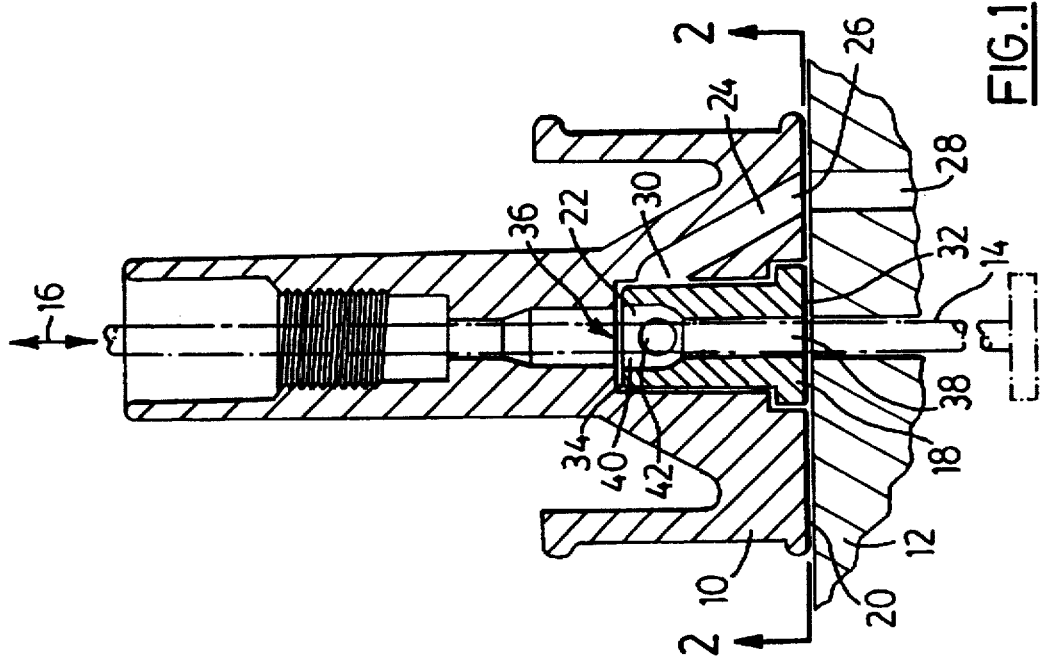

MELT DUCTING ARRANGEMENT FOR INJECTION MOLDING NOZZLE

FIELD OF THE INVENTION

This invention relates generally to injection molding machine nozzles and more particularly to melt ducting arrangements for injection molding nozzles for valve gated multi-cavity injection molds.

BACKGROUND OF THE INVENTION

Injection molding machines are generally provided with a single melt passage from a heated auger in which pelletized "plastic" is melted and transported. When multi-cavity molds are utilized, a manifold is required to distribute melt from the melt passage to each of a plurality of heated nozzles which inject melt into each mold cavity.

In order to shut off flow of melt through the heated nozzles after each injection cycle, the heated nozzles may be provided with a valve pin axially slideable along a nozzle bore. Each valve pin is typically a cylindrical rod. An outer end of the valve pin is received in a nozzle tip which is opened and closed by sliding the valve pin in and out of the nozzle tip. The valve pin is supported along its length by a guide bushing mounted in a manifold end of the heated nozzle which is distal the nozzle tip. The guide bushing both supports the valve pin, and seals the valve pin to prevent seepage of the melt out of the manifold end of the heated nozzle. The guide bushing is a replaceable component which can be exchanged for a new component when wear caused by axial sliding of the valve pin in the guide bushing becomes excessive thereby avoiding replacement of the entire heated nozzle.

In conventional designs melt is introduced into the heated nozzle between the guide bushing and the nozzle tip, generally near an inner end of the guide bushing. In such designs, a melt conduit is provided between a melt outlet in the manifold and an inner bore of the heated nozzle, with adequate clearance being provided between the inner bore and the valve pin to allow melt to flow therebetween toward the nozzle tip.

A problem with conventional designs of the above type is that generally only a single conduit is provided which often results in dissimilar melt flow characteristics on opposite sides of the valve pin thereby resulting in streaking in molded articles.

A further disadvantage to such conventional designs is that a portion of the melt tends to pool in a region adjacent the inner end of the guide bushing opposite the melt conduit. Accordingly when colour changes are made, a considerable number of cycles are required before discoloration arising from bleeding out of the pool ceases.

U.S. Pat. No. 4,705,473 (Schmidt) provides an arrangement which overcomes the prior problems of streaking and melt pooling. The Schmidt arrangement introduces melt into the heated nozzle through a specially configured guide bushing. The guide bushing of Schmidt has a melt passage which fluidly communicates at one end with the manifold outlet which has branches extending about the bushing for guiding melt around the pin to introduce melt into the nozzle through diametrically opposed outlets in the bushing.

The Schmidt arrangement nevertheless has certain inherent shortcomings. Firstly, the guide bushing design is quite complicated as the bushing is made up of two parts, each containing one side of a melt conduit which are individually machined and subsequently brazed together into a finished part. Secondly, as the guide bushing requires periodic replacement because of wear, the complexity and inherent cost of the Schmidt arrangement increases operating costs over replacing a conventional guide bushing.

Additionally, the Schmidt arrangement requires a modified cavity plate with a recess for receiving the specialized guide bushing. It is an object of the present invention to provide a melt ducting arrangement which introduces melt into a heated nozzle through a guide bushing through at least two spaced apart openings.

It is a further object of the present invention to provide such an arrangement which utilizes a relatively simple one piece guide bushing that can be utilized with a conventional cavity plate.

SUMMARY OF THE INVENTION

A melt ducting arrangement for a multi-cavity injection molding system having a heated nozzle, a valve pin axially slideable in said heated nozzle and a guide bushing for said valve pin mounted in a manifold end of said heated nozzle; said melt ducting arrangement comprising:

- a groove in said heated nozzle extending at least part way around said guide bushing;

- a melt passage extending between said groove and said manifold end of said heated nozzle, said melt passage having an inlet for registering with a melt passage in a manifold and an outlet into said groove to provide a melt conduit between said manifold and said groove;

- said guide bushing having an outer end adjacent said manifold and an inner end extending into said nozzle, said bushing further having a hole extending generally axially therethrough, said hole having a narrower diameter portion at said outer end for slideably receiving and guiding said valve pin and a wider diameter portion at said inner end to provide space for receiving melt between said valve pin and said bushing; and,

- said guide bushing further having a plurality of openings extending therethrough into said wider diameter portion and registering with said groove to provide a melt conduit between said groove and said wider diameter portion of said hole.

DESCRIPTION OF DRAWINGS

A preferred embodiment of the present invention is described below with reference to the accompanying drawings in which:

FIG. 1 is a sectional view through a melt ducting arrangement according to the present invention;

FIG. 2 is a plan view of a heated nozzle and guide bushing according to the present invention; and, FIG. 3 is a perspective view of a guide bushing according to the present invention.

DESCRIPTION OF PREFERRED EMBODIMENTS

FIG. 1 illustrates a heated nozzle 10 according to the present invention adjacent a manifold 12. A valve pin 14, shown in dashed outline, is axially slideable in the direction of arrows 16 in a guide bushing 18, mounted in a manifold end 20 of the heated nozzle 10.

A groove 22 in FIGS. 1 and 2 extends approximately half way around the guide bushing 18. A melt passage 24 extends between the groove 22 and the manifold end 20 of the heated nozzle 10. The melt passage 24 has an inlet 26 which registers with a melt passage 28 in the manifold 12. The melt passage 24 further has an outlet 30 into the groove 22 to provide a melt conduit between the melt passage 28 and the groove 22.

The guide bushing 18 has an outer end 32 adjacent the manifold 12 and an inner end 34 extending into the nozzle 10. The guide bushing 18 further has a hole generally indicated by reference 36 extending generally axially therethrough. The hole 36 has a narrower diameter portion 38 at its outer end 32 for slideably receiving the valve pin 14. The hole 36 has a wider diameter portion 40 at its inner end 34 to provide space for receiving melt between the valve pin 14 and the interior of the guide bushing 18.

The guide bushing 18 is provided with two diametrically spaced openings 42 therethrough registering with the groove 22 to permit melt to flow from the groove 22 through the openings 42 into the wider diameter portion 40 of the hole 36.

As melt is introduced on opposite sides of the valve pin 14 by virtue of the diametrically spaced openings 42, the melt ducting arrangement of the present invention overcomes the problems described in the background above associated with feeding melt through the nozzle on only one side of the pin 14. As the melt passes about the guide bushing 18 in a space defined by the groove 22 and the exterior of the guide bushing, the guide bushing is a relatively simple one piece construction which doesn't require a melt passage to be provided therein between the openings 42.

Although a semi-circular groove 22 is illustrated, it is expected that other configurations may work. For example, the groove 22 may extend all the way about the pin 14 and three or more openings 42 may be provided.

In order to ensure proper alignment between the groove 22 and the openings 42, particularly where the groove 22 does not extend completely about the valve pin 14, provision should be made to locate the guide bushing 18 in the heated nozzle 10. One way of accomplishing this, as illustrated in FIG. 2, is to provide the nozzle 10 and the guide bushing 18 with mating shapes, such as flats 44 which allow the guide bushing 18 to only be inserted in the nozzle 10 with the holes 42 registering with the groove 22 and prevent rotation of the guide bushing 18 in the nozzle 10.

The above description is intended in an illustrative rather than a descriptive sense. Variations to the exact description may be apparent to persons skilled in the relevant art without departing from the spirit and scope of the present invention as defined by the claims set out below.

I claim:

1. A melt ducting arrangement for a multi-cavity injection molding system, said melt ducting arrangement having a heated nozzle, a valve pin axially slidable in said heated nozzle and a guide bushing for said valve pin mounted in a manifold end of said heated nozzle; said melt ducting arrangement comprising:

a groove in said heated nozzle extending at least part way around said guide bushing;

a melt passage extending between said groove and said manifold end of said heated nozzle, said melt passage having an inlet for registering with a melt passage in a manifold and an outlet into said groove to provide a melt conduit between said manifold and said groove;

said guide bushing having an outer end adjacent said manifold and an inner end extending into said nozzle, said bushing further having a hole extending generally axially therethrough, said hole having a narrower diameter portion at said outer end for slideably receiving and guiding said valve pin and a wider diameter portion at said inner end to provide space for receiving melt between said valve pin and said bushing; and said guide bushing further having a plurality of openings extending therethrough into said wider diameter portion and registering with said groove to provide a melt conduit between said groove and said wider diameter portion of said hole.

2. A melt ducting arrangement as claimed in claim 1 wherein:

said guide bushing has two generally diametrically opposed openings; and, said groove extends approximately half way about said bushing.

3. A melt ducting arrangement as claimed in claim 1 wherein said nozzle and said guide bushing have mating shapes to locate said guide bushing in said nozzle with said holes aligned with said groove.

4. A melt ducting arrangement as claimed in claim 2 wherein said nozzle and said guide bushing have mating shapes to locate said guide bushing in said nozzle with said holes aligned with said groove.

* * * * *